United States Patent [19]

Meckler

[11] 4,030,259

[45] June 21, 1977

[54] METHOD FOR FORMING WIRING CHANNELS IN A CONCRETE FLOOR

[76] Inventor: Gershon Meckler, 7425 Democracy Blvd. - Unit 212, Bethesda, Md. 20034

[22] Filed: Dec. 10, 1975

[21] Appl. No.: 639,295

[52] U.S. Cl. .................................. 52/221; 52/741
[51] Int. Cl.² ........................................ E04B 5/48
[58] Field of Search ............ 52/220, 221, 173, 741; 174/48, 49, 96, 97

[56] References Cited

UNITED STATES PATENTS

| | | | |
|---|---|---|---|
| 2,741,117 | 4/1956 | Hoseason | 52/221 |
| 3,592,956 | 7/1971 | Fork | 52/221 X |
| 3,886,702 | 6/1975 | Fork | 52/221 |

FOREIGN PATENTS OR APPLICATIONS

| | | | |
|---|---|---|---|
| 1,280,649 | 11/1961 | France | 52/221 |

*Primary Examiner*—J. Karl Bell

*Attorney, Agent, or Firm*—Oliver E. Todd, Jr.

[57] ABSTRACT

An improved method and structure for forming wiring channels in a concrete floor. Parallel trenches are formed in a concrete floor slab when the slab is poured. A metal cover placed over each trench has a metal U-shaped channel attached thereto for dividing the trench into at least two and preferably three separate wire raceways with the center raceway completely shielded by the channel and cover. Access boxes are selectively positioned over knockouts in the cover plate. Metal channels are positioned to extend perpendicular to the trenches for forming main distribution ducts. A concrete surface is then poured over the slab to extend flush with the tops of the access boxes and the main distribution ducts and a cover plate is attached to enclose the main distribution ducts. The resulting floor structure has embedded therein parallel wiring raceways spaced across the floor with spaced accesses into each raceway and main distribution ducts interconnecting the parallel raceways.

3 Claims, 3 Drawing Figures

U.S. Patent June 21, 1977 4,030,259
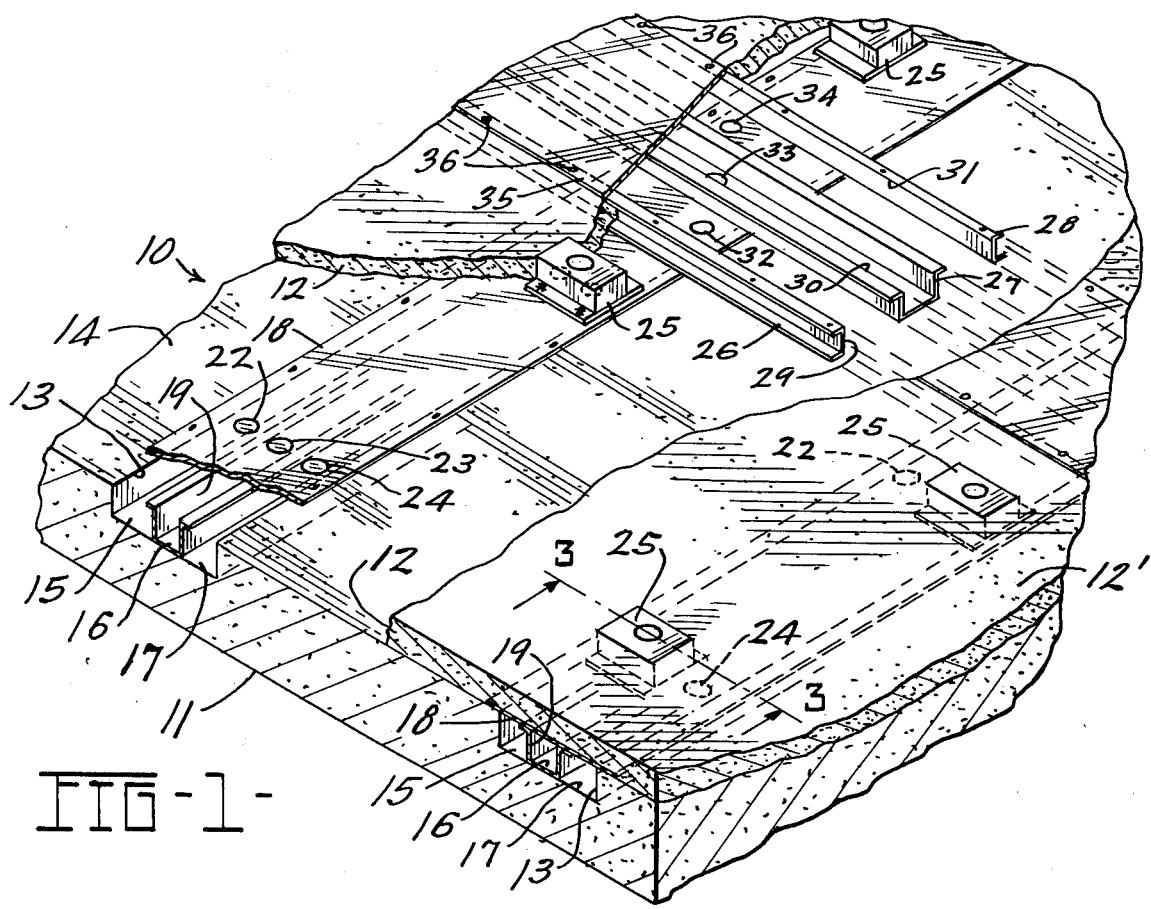
FIG-1-
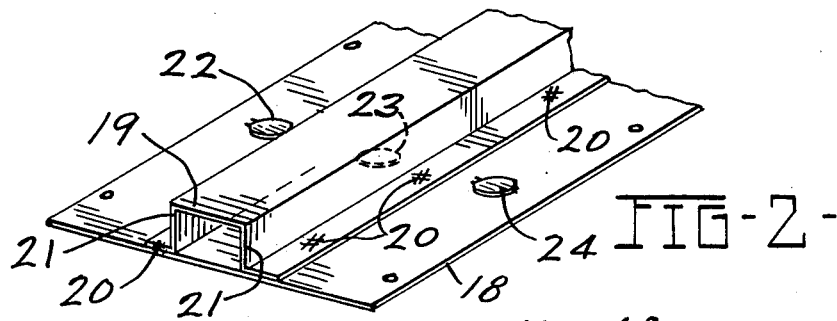
FIG-2-
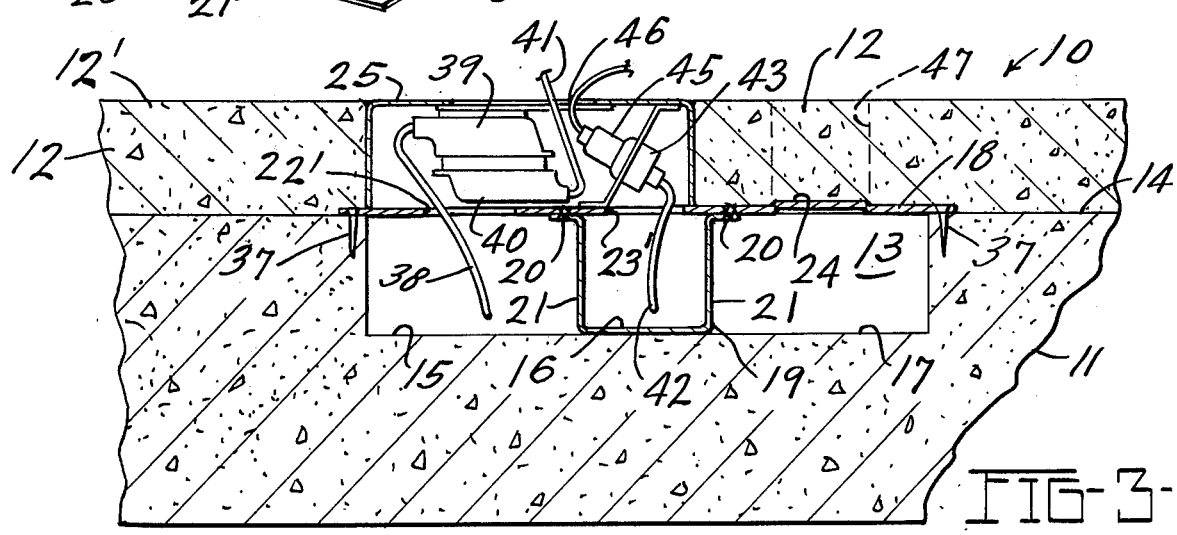
FIG-3-

METHOD FOR FORMING WIRING CHANNELS IN A CONCRETE FLOOR

BACKGROUND OF THE INVENTION

This invention relates to electrical wiring ducts for a building and more particularly to an improved method and structure for forming electrical wiring ducts in a concrete building floor.

Buildings formed from concrete are often partially constructed before a final floor plan is selected. After the basic building structure is erected, such buildings are subdivided into spaces such as individual offices. Utility ducts for wiring and comfort conditioning are sometimes formed in poured concrete floors to facilitate supplying required utilities to each space into which the building is subsequently divided. One prior art method for forming utility ducts in a poured concrete floor is shown in U.S. Pat. No. 3,093,933 which issued June 18, 1963 to Slingluff and in U.S. Pat. No. 2,975,559 which issued Mar. 21, 1961 to Hedgren. These patents disclose a building floor structure having a metallic cellular subflooring which forms parallel cells or conduits for carrying electrical cables and for air handling. Electrical ducts also are located immediately above and perpendicular to the cellular subflooring. These ducts are spaced across the subflooring to provide a desired spacing for electrical service connections. Access fittings are attached to the ducts at desired locations and the ducts are connected to the appropriate subfloor cells. A concrete floor is then poured over the cellular subflooring to embed the electrical ducts. Wiring for power and communications is passed through the subflooring cells and the desired ducts for serving the floor area wherever such service is needed. By running electrical power and communications wiring through different subfloor cells and through alternate ducts, the power wiring is shielded in accordance with some building codes and the communication wiring is isolated from the power wiring to minimize induced electrical noise. However, a building floor structure of this type is unnecessarily expensive because of the high cost for the cellular metallic subflooring and of the need for using separate metal channels for forming both power and communications ducts in the floor.

SUMMARY OF THE INVENTION

According to the present invention, an improved method and structure is provided for forming wiring ducts or raceways in a concrete building floor. The structure provides separate raceways for electrical power wiring and communications wiring with only the power raceways completely shielded by metal.

In accordance with the present method, a building floor slab is poured from concrete or a similar hardenable material to a depth leaving room for a concrete topping or surface layer. Parallel trenches are formed in the upper surface of the floor slab at the time of pouring. After the floor slab hardens, a metal cover plate is placed over each trench. A U-shaped metal channel is attached to the bottom of the cover plate to extend the length of the trench for dividing the trench into at least two and preferably three separate raceways. The center raceway, which is defined by the U-shaped metal channel and the metal cover plate, is completely shielded for carrying electrical power wiring while the remaining raceways on each side of the U-shaped channel are unshielded. These channels carry communications wiring such as telephone wires, computer input, output and control wires, process control wires, intercom wires, etc. Access boses are attached to the top of the trench cover plate over one or more knockouts for providing desired access to wires located in the raceways. Metal channels also are placed perpendicular to and across all of the trenches for defining main power distribution ducts interconnecting the various parallel raceways. A topping or surface layer of concrete or other hardenable material is then poured over the previously poured concrete floor slab to extend flush with the top of the access boxes and the channels forming the power distribution ducts. Electrical wiring for servicing power and communication needs on the floor area is completed by passing wires through the raceways between the main distribution channels and the access boxes and finally attaching a cover plate over the main distribution channels. Through this arrangement, power wiring for the entire system is shielded from the communication wiring to minimize electrical noise induced into the communications wiring. Furthermore, the cost of placing a metallic cellular subflooring in the building and separate metal ducts for defining both power and communications raceways is eliminated.

Accordingly, it is a preferred object of the invention to provide an improved method and structure for forming wiring ducts in a concrete building floor.

Another object of the invention is to provide a method for constructing parallel communications and power wiring ducts in a concrete floor with shielding for only the power wiring.

Other objects and advantages of the invention will become apparent from the following detailed description, with reference being made to the accompanying drawings.

BRIEF DESCRIPTION OF THE DRAWINGS

FIG. 1 is a fragmentary, sectioned perspective view of an improved concrete floor structure having wiring ducts formed therein in accordance with the present invention;

FIG. 2 is an enlarged fragmentary, sectioned perspective view of an inverted cover plate for dividing a trench formed in a concrete floor slab into three separate raceways; and FIG. 3 is an enlarged fragmentary, cross-sectional view taken along line 3—3 of FIG. 1.

DESCRIPTION OF THE PREFERRED EMBODIMENTS

Turning now to the drawings and particularly to FIG. 1, a building floor structure 10 is shown embodying the structure and constructed by the method of the present invention. The floor structure 10 basically comprises a concrete floor slab 11 and a concrete surface or topping layer 12. Ducts or raceways are formed in the slab 11 and the surface layer 12 for supplying electrical power and communications to predetermined spaced locations in the building in which the floor structure 10 is constructed. Sufficient number of access points to the electrical ducts are provided in the surface layer 12 for supplying power and communications requirements over the floor area regardless of the manner in which the floor area is subsequently subdivided.

When the concrete floor slab 11 is poured, a plurality of parallel trenches 13 are formed in an upper surface 14 of the slab 11. The trenches 13 may be formed by any suitable means, such as by placing wooden forms (not shown) in the upper structure 14 for forming the trenches 13 and, after the concrete in the floor slab 11 has at least partially hardened, removing such forms. After the slab 11 is poured and hardened, at least some of the trenches 13 are divided into at least two separate wiring ducts or raceways, with three raceways 15–17 shown in the drawings. The raceways 15–17 are formed by placing a cover plate 18 over each trench 13 to extend along the entire length of such trench. As best seen in FIG. 2, a generally U-shaped channel 19 is attached to the cover plate 18. The U-shaped channel 19 is attached to the cover plate 18 by any suitable means, as by spot welds 20 or by rivets, screws, bolts, etc. The channel 19 has sides 21 of a heighth corresponding to the depth of the trench 13 for dividing the trench 13 into the separate ducts 15–17. It will be noted that the center duct 16 is defined by the U-shaped channels 19 and the cover plate 18 and, therefore, is completely shielded with metal. The ducts 15 and 17 are defined by the concrete walls of the trench 13 on two sides, by the channel sides 21 and by the cover plate 18. Because of the shielding, the duct 16 is particularly suitable for carrying power wires while the ducts 15 and 17 preferably are used for carrying communications wires such as telephone wires, local intercom wires, process control wires, and the like. By shielding the power wires in the duct 16, electrical noise induced into the communication wires is minimized.

Groups of three knockouts 22, 23 and 24 are spaced along each of the cover plates 18 for providing access points through the cover plate 18 into the ducts 15–17, respectively. If, for example, the trenches 13 are located parallel to each other with a five foot center-to-center spacing and each group of knockouts 22–24 is placed at a five foot spacing in the cover plates 18, then the floor structure 10 will have access points into the ducts 15–17 in a grid pattern across the floor structure 10 with a five foot spacing. Such a spacing would normally be sufficient for providing adequate power and communications outlets in a building. The rectangular access boxes 25 may be attached to the cover plate 18 at each group of knockouts 22–24. The access boxes are shown as having a width which permits covering two adjacent ones of the knockouts, such as the knockouts 22 and 23 for providing access to the communications and power ducts 15 and 16 or the knockouts 23 and 24 for providing access to the power and communications ducts 16 and 17. In a preferred embodiment, the access boxes 25 are staggered such that one box 25 on a cover plate 18 provides access to the ducts 15 and 16 through the knockouts 22 and 23 and the next access box 25 on the cover plate 18 provides access to the ducts 16 and 17 through the knockouts 23 and 24. However, it should be appreciated that the width of the access boxes 25 may be such that a box 25 provides access through only one knockout 22, 23 or 24 to one duct 15, 16 or 17, or that a box 25 provides access through all three knockouts 22–24 to the three ducts 15–17.

In addition to the access boxes 25, three channels 26–28 are positioned to extend across and rest upon the cover plates 18. The channels 26–28 are preferably connected to each cover plate 18 to provide electrical ground continuity. The channels 26 and 28 are generally C-shaped while the channel 27 spaced between the channels 26 and 28 is generally U-shaped. In addition, the channels 26–28 have the same heighth as the height of the access boxes 25. After the channels 26–28 are positioned and attached to the cover plates 18, the concrete surface or topping layer 12 is poured to form a top surface 12' which extends flush with the tops of the access boxes 25 and the channels 26–28.

After the surface layer 12 is poured and has hardened, communications and power wires are run through the raceways or ducts 15–17 and three main distribution raceways or ducts 29–31 formed between the channels 26–28 and within the channel 27. As previously indicated, the channels 26–28 extend across all of the cover plates 18 over the trenches 13. Although not mandatory, it may be preferable to position the channels 26–28 perpendicular to the trenches 13. The main distribution raceway or duct 29 between the channels 26 and 27 communicates through an opening 32 in each cover plate 18 to the raceway 17. An opening 33 passes through the bottom of the U-shaped channel 27 and each cover plate 18 for communicating within the duct 30 formed by the channel 27 to each duct 16. Similarly, the duct or raceway 31 formed between the channels 27 and 28 is connected through an opening 34 in each cover plate 18 to the duct or raceway 15. Thus, communications wires are laid in the raceway or duct 29 and passed through the raceway 17 for communicating through the knockouts 24 and access boxes 25 to predetermined locations on the floor structure. Similarly, power wires are passed through the duct 30 formed by the channel 27, through the opening 33 and through the duct 16 for supplying power through the knockouts 23 and access boxes 25 to predetermined locations in the floor structure 10. Communications wires may also be positioned in the duct or raceway 31 and passed through the openings 34 and the ducts or raceways 15. After the wires are positioned in the ducts or raceways 29–31 and 15–17, a cover plate 35 is positioned over the channels 26–28 and fastened to the channels 26 and 28 by means of suitable fasteners 36. The cover plates 35 and 18 and the channels 19 and 26–28 and the access boxes 25 are all grounded for safety. Since the power wires in the ducts 30 and 16 are completely surrounded by the channel 27 and its cover plate 35 and the channel 19 and its cover plate 18, the power wires are all completely shielded. The shielding protects the communications wires from damage in the event of a short circuit in the power wires and also reduces electrical noise which otherwise might be induced into the communications circuits.

Turning now to FIG. 3, a cross section is shown through the ducts 15–17 in one trench 13 and through an access box 25. Although it may not always be required, it will be noted that fasteners 37 are shown attaching the cover plate 18 to the poured concrete slab 11. The fasteners 37 may be of any suitable design, such as explosively driven nails. The primary purpose for the fasteners 37 is to maintain the cover plate 18 centered over the trench 13 while the surface layer 12 is poured. It should be appreciated that if the cover plate 18 is allowed to move while pouring the surface layer 12, the concrete or other hardenable material forming the surface layer 12 may flow into the trench 13. After the cover plate 18 is positioned over the trench 13 to divide the trench into the three separate raceways or ducts 15–17, the access box 25 is attached to the cover plate 18 over either the knockouts 22 and 23 or the knockouts 23 and 24. As shown in FIG. 3, the knockouts 22 and 23 are removed leaving openings 22' and 23', respectively, through the cover plate 18 and into the ducts 15 and 16. The access box 25 is then positioned over these openings 22' and 23'. Wires are positioned in the ducts 15–17 at any suitable time during construction of the floor structure 10. For example, the wires may be run in the ducts 15–17 at the time the cover plate 18 is positioned over the trench 13 and prior to pouring the surface layer 12. Or, wires may be pulled through the ducts 15–17 after the floor structure 10 is completed. A telephone wire 38 is shown exempifying a typical wire located in the duct 15. The telephone wire 38 passes through the cover plate opening 22' and is terminated at a connector 39. When telephone installation is completed, a serviceman connects a mating connector 40 attached to a line 41 which connects to a telephone (not shown) to the connector 39. The connectors 39 and 40 are positioned within the access box 25 to eliminate any obstacles on the top floor surface 12'. An exemplary power wire 42 is shown in the power duct 16. The power conductor 42 passes through the cover plate opening 23' and is terminated at a standard power receptacle 43. An electrical appliance line cord 44 having a standard plug 45 may subsequently be passed through an opening 46 in the access box 25 and plugged into the receptacle 43. The opening 46 is sufficiently large as to permit users of the building to remove the plug 45 or to plug in other appliances.

As shown in FIG. 3 the access box 25 normally provides access to the power duct 16 and to one of the two communication ducts 15 or 17. It may be desirable, for example, to place only telephone wires in one of the communication ducts, duct 15 is shown, and to place other communication wires in the duct 17. Furthermore, it also may be desirable to stagger the location of the access boxes 25 such that every other access box on a cover plate 18 provides access to the duct 15 while the remaining alternate access boxes 25 provide access to the duct 17. As represented by the dashed lines 47, if access is subsequently desired into the duct 17 where such access is not provided by an access box 25, an opening above the knockout 24 may be formed through the surface layer 12. Such an opening may be formed by any suitable means, as by drilling through the surface layer 12 or by providing a plug in the surface area 12 which is readily removable at a later date. Of course, where access is desired into both of the communication ducts 15 and 17, the access box 25 may be constructed sufficiently large as to cover each of the three knockouts 22, 23 and 24.

Although the drawings specifically show a floor structure 10 having three parallel ducts formed in each trench 13, it will be appreciated that any other desired number of ducts may be formed in a floor trench. For example, if only a single communication duct and a single power duct are desired, the trench 13 may be formed of a width sufficient to form only a single communication duct, duct 15 for example, and a single power duct 16. In such event, the U-shaped channel 19 would be located near one side of the cover plate 18 rather then centered as shown in the drawings. Where additional ducts are desired, it will also be appreciated that more than one U-shaped channel 19 may be attached to the bottom of the trench cover plate 18 for forming the desired number of ducts in the concrete floor slab 11.

It will be appreciated that various other modifications and changes may be made in the above-described preferred embodiments of the invention without departing from the spirit and the scope of the following claims.

What is clamed is:

1. A method for forming a plurality of electrical wiring ducts in a building floor comprising the steps of: pouring a floor slab from a hardenable material; forming at least one trench in the upper surface of said poured floor slab before such material hardens; after such material hardens, placing a metal cover plate having a metal U-shaped channel attached thereto over said trench with said channel dividing said trench into at least two parallel ducts with one duct defined by said cover plate and said U-shaped channel; selectively attaching access boxes to the upper surface of said cover plate for providing access into said ducts, and pouring a surface layer of a hardenable material over said slab and said cover plate.

2. A method for forming a plurality of electrical wiring ducts in a building floor, as set forth in claim 1, wherein said cover plate is placed over said trench such that said U-shaped channel divides said trench into three parallel ducts with the center one of said three ducts defined by said cover plate and said U-shaped channel.

3. A method for forming a plurality of electrical wiring ducts in a building floor, as set forth in claim 1, wherein a plurality of parallel trenches are formed in the upper surface of said poured slab and a cover plate is placed over each trench, at least some of such cover plates having a U-shaped channel attached thereto which divides the trench covered by such plates into at least two parallel ducts, and further including the step of placing a plurality of parallel channel members across all of said cover plates prior to pouring said surface layer for forming main distribution ducts interconnecting corresponding ducts in each of said trenches, pouring said surface layer to a thickness substantially flush with the tops of said access boxes and said channel members, and attaching a cover plate to said channel members for enclosing said main distribution ducts.

* * * * *